(12) United States Patent
Jadhav et al.

(10) Patent No.: US 9,353,635 B2
(45) Date of Patent: May 31, 2016

(54) SEAL END ATTACHMENT

(75) Inventors: Sanjay Shankar Jadhav, Karnataka (IN); Pradeep Jagannath Ghute, Karnataka (IN); Ajay Gangadhar Patil, Greer, SC (US); Rohit Pruthi, Karnataka (IN)

(73) Assignee: General Electric Company, Schenectady, NY (US)

( * ) Notice: Subject to any disclaimer, the term of this patent is extended or adjusted under 35 U.S.C. 154(b) by 1055 days.

(21) Appl. No.: 13/210,902

(22) Filed: Aug. 16, 2011

(65) Prior Publication Data

US 2013/0042631 A1 Feb. 21, 2013

(51) Int. Cl.
| *F16J 15/06* | (2006.01) |
| *F01D 9/02* | (2006.01) |
| *F23R 3/60* | (2006.01) |
| *F16J 15/16* | (2006.01) |
| *F02C 7/20* | (2006.01) |

(52) U.S. Cl.
CPC ............... *F01D 9/023* (2013.01); *F16J 15/061* (2013.01); *F02C 7/20* (2013.01); *F16J 15/164* (2013.01); *F23R 3/60* (2013.01)

(58) Field of Classification Search
CPC .......... F16J 15/164; F16J 15/061; F23R 3/60; F01D 9/023; F02C 7/20
USPC ........... 60/796, 797, 798, 799, 800, 805, 806, 60/752, 753, 754, 755, 756, 757, 758, 759, 60/760; 277/628, 644, 647, 630, 637
See application file for complete search history.

(56) References Cited

U.S. PATENT DOCUMENTS

| 3,975,114 | A | * | 8/1976 | Kalkbrenner | ............... 415/210.1 |
| 4,452,462 | A | * | 6/1984 | Karr, Jr. | ......................... 285/112 |
| 4,626,002 | A | * | 12/1986 | Hagemeister et al. | .......... 285/95 |
| 5,169,159 | A | | 12/1992 | Pope et al. | |
| 5,400,586 | A | * | 3/1995 | Bagepalli et al. | ............... 60/800 |
| 5,433,454 | A | * | 7/1995 | Ramberg | ....................... 277/643 |
| 5,624,227 | A | * | 4/1997 | Farrell | ........................... 415/139 |
| 5,984,314 | A | | 11/1999 | Peters et al. | |
| 6,082,738 | A | | 7/2000 | Peters et al. | |
| 6,199,871 | B1 | * | 3/2001 | Lampes | ....................... 277/614 |

(Continued)

FOREIGN PATENT DOCUMENTS

| CN | 101287898 A | 10/2008 |
| CN | 101435345 A | 5/2009 |

(Continued)

OTHER PUBLICATIONS

Search Report and Written Opinion from EP Application No. 12179887.0 dated Nov. 20, 2012.

(Continued)

*Primary Examiner* — Phutthiwat Wongwian
*Assistant Examiner* — Marc Amar
(74) *Attorney, Agent, or Firm* — Ernest G. Cusick; Frank A. Landgraff

(57) ABSTRACT

A seal end attachment is provided and includes a vessel through which a working fluid flows, the vessel being formed to define a recess with a mating surface therein, a seal contacting the mating surface and a pressing member being more responsive to a high temperature condition associated with the flow of the working fluid than the vessel and being disposed within the recess to press the seal against the mating surface responsive to the condition being present.

19 Claims, 5 Drawing Sheets

(56) References Cited

U.S. PATENT DOCUMENTS

| | | | |
|---|---|---|---|
| 6,502,825 B2 | 1/2003 | Aksit et al. | |
| 6,547,257 B2 * | 4/2003 | Cromer | 277/630 |
| 6,561,522 B1 * | 5/2003 | Radelet et al. | 277/628 |
| 6,637,751 B2 * | 10/2003 | Aksit et al. | 277/416 |
| 6,644,667 B2 | 11/2003 | Grondahl | |
| 6,786,048 B2 * | 9/2004 | Tiemann | 60/752 |
| 6,808,179 B1 | 10/2004 | Bhattacharyya et al. | |
| 6,857,639 B2 * | 2/2005 | Beeck et al. | 277/637 |
| 6,926,284 B2 | 8/2005 | Hirst | |
| 6,994,354 B2 * | 2/2006 | Sakata | 277/598 |
| 7,140,647 B2 * | 11/2006 | Ohmi et al. | 285/328 |
| 7,217,081 B2 * | 5/2007 | Scheurlen et al. | 415/1 |
| 7,578,509 B2 | 8/2009 | Grondahl | |
| 7,600,649 B1 | 10/2009 | Clark | |
| 7,624,991 B2 * | 12/2009 | Putch | 277/606 |
| 7,788,932 B2 | 9/2010 | Kunitake et al. | |
| 7,845,649 B2 * | 12/2010 | Kowalczyk | 277/641 |
| 8,191,374 B2 * | 6/2012 | Nanataki et al. | 60/806 |
| 8,210,799 B1 * | 7/2012 | Rawlings | 415/135 |
| 8,382,424 B1 * | 2/2013 | Liang | 415/115 |
| 8,678,754 B2 * | 3/2014 | Morgan et al. | 415/138 |
| 8,695,989 B2 * | 4/2014 | Dahlke et al. | 277/644 |
| 2002/0130469 A1 * | 9/2002 | Kono | 277/355 |
| 2003/0039542 A1 | 2/2003 | Cromer | |
| 2004/0051254 A1 * | 3/2004 | Smed | 277/628 |
| 2005/0242525 A1 * | 11/2005 | Dahlke et al. | 277/605 |
| 2007/0114727 A1 * | 5/2007 | Greif et al. | 277/355 |
| 2008/0224414 A1 * | 9/2008 | Zheng et al. | 277/355 |
| 2009/0045592 A1 * | 2/2009 | Hurlbert et al. | 277/628 |
| 2009/0115141 A1 | 5/2009 | Simmons | |
| 2010/0158674 A1 | 6/2010 | Turnquist et al. | |
| 2010/0247005 A1 | 9/2010 | Aschenbruck et al. | |

FOREIGN PATENT DOCUMENTS

| | | |
|---|---|---|
| EP | 1521036 A1 | 4/2005 |
| EP | 1914454 A1 | 4/2008 |
| WO | 9853228 A1 | 11/1998 |
| WO | 0012870 A1 | 3/2000 |

OTHER PUBLICATIONS

Unofficial English Translation of Chinese Office Action issued in connection with corresponding CN Application No. 201210291821.6 on May 20, 2015.

* cited by examiner

9,353,635 B2

SEAL END ATTACHMENT

BACKGROUND OF THE INVENTION

The subject matter disclosed herein relates to a seal end attachment.

In gas turbine engines, combustion of fuel and compressed air occurs in a combustor. High temperature and high energy fluids produced by that combustion are directed to flow from the combustor into a transition piece and toward a turbine section. The transition piece and the turbine section are normally coupled to one another at an aft frame of the transition piece and the stage 1 nozzle. This coupling can be achieved by advanced cloth seals.

During turbine operations and transient cycles in particular, the transition piece and the stage 1 nozzle may experience differential axial and radial deformation that affects several components including the seals between the transition piece and the stage 1 nozzle. In fact, field experience has revealed that the stage 1 nozzle tends to creep and due to nozzle creep deflection, seal effectiveness decreases. This decreased seal effectiveness in turn results in cooling air leakage to the primary flow path causing performance loss.

BRIEF DESCRIPTION OF THE INVENTION

According to one aspect of the invention, a seal end attachment is provided and includes a vessel through which a working fluid flows, the vessel being formed to define a recess with a mating surface therein, a seal contacting the mating surface and a pressing member being more responsive to a high temperature condition associated with the flow of the working fluid than the vessel and being disposed within the recess to press the seal against the mating surface responsive to the condition being present.

According to another aspect of the invention, a seal end attachment is provided and includes a vessel through which a working fluid flows, the vessel being formed to define a recess with mating and shoulder surfaces therein, a seal contacting the mating surface and a pressing member being more responsive to a high temperature condition associated with the flow of the working fluid than the vessel and being disposed to contact the shoulder surface and the seal within the recess to press the seal against the mating surface responsive to the condition being present while being supported by the shoulder surface.

According to yet another aspect of the invention, a gas turbine having a seal end attachment is provided and includes first and second vessels through which a working fluid flows, each of the first and second vessels being formed to define respective recesses with mating and shoulder surfaces therein, a seal extending between the recesses and contacting the mating surfaces and first and second pressing members disposed within the recesses of the first and second vessels, respectively. Each of the first and second pressing members are more responsive than the first and second vessels to a high temperature condition caused by the flow of the working fluid affecting respective temperatures of the first and second vessels and the first and second pressing members, and each of the first and second pressing members are disposed to contact the respective shoulder surfaces and the seal to press the seal against the respective mating surfaces responsive to the condition being present while being supported by the respective shoulder surfaces.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
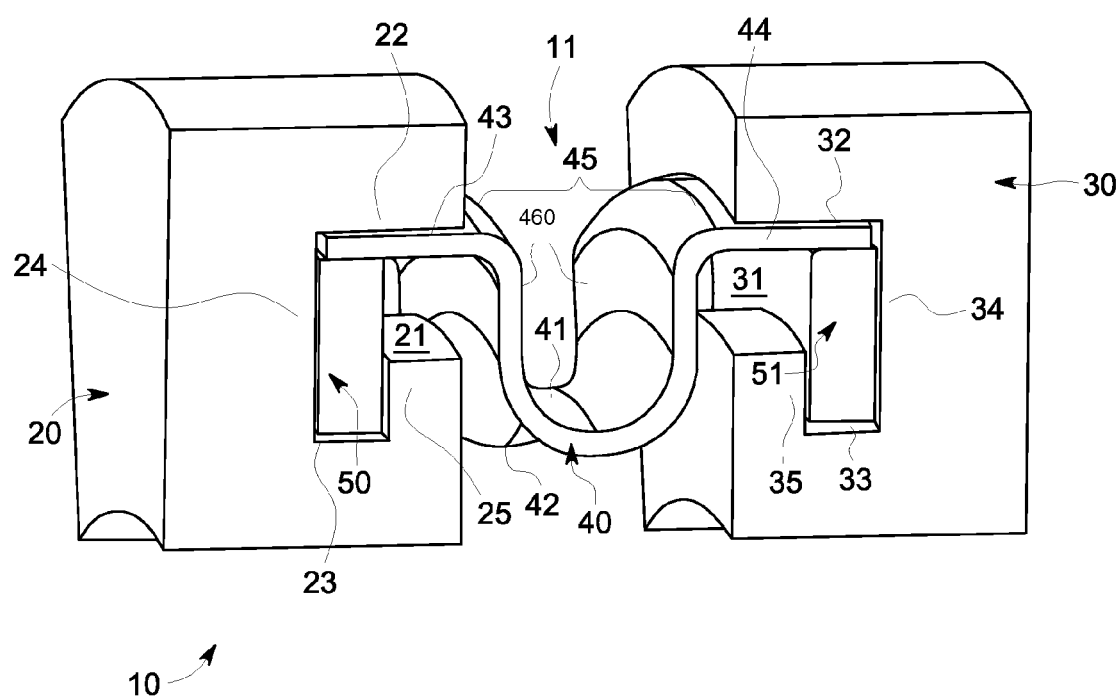
FIG. 1 is a perspective view of a portion of a seal end attachment.

With reference to FIG. 1, a portion of a gas turbine 10 is provided and has a seal end attachment 11 to prevent leakage of working fluid of the gas turbine 10 resulting from differential thermal growth and to prevent compressor discharge air from mixing with and reducing the temperature of the working fluid resulting from differential thermal growth. The seal end attachment 11 includes a first vessel 20, such as an aft end of a transition piece, and a second vessel 30, such as a forward end of a stage 1 nozzle, although it is to be understood that the first and second vessels 20 and 30 may be any interfacing vessels where differential thermal growth occurs. The first vessel 20 and the second vessel 30 each form passages through which the working fluid sequentially flows.

Figure 2:
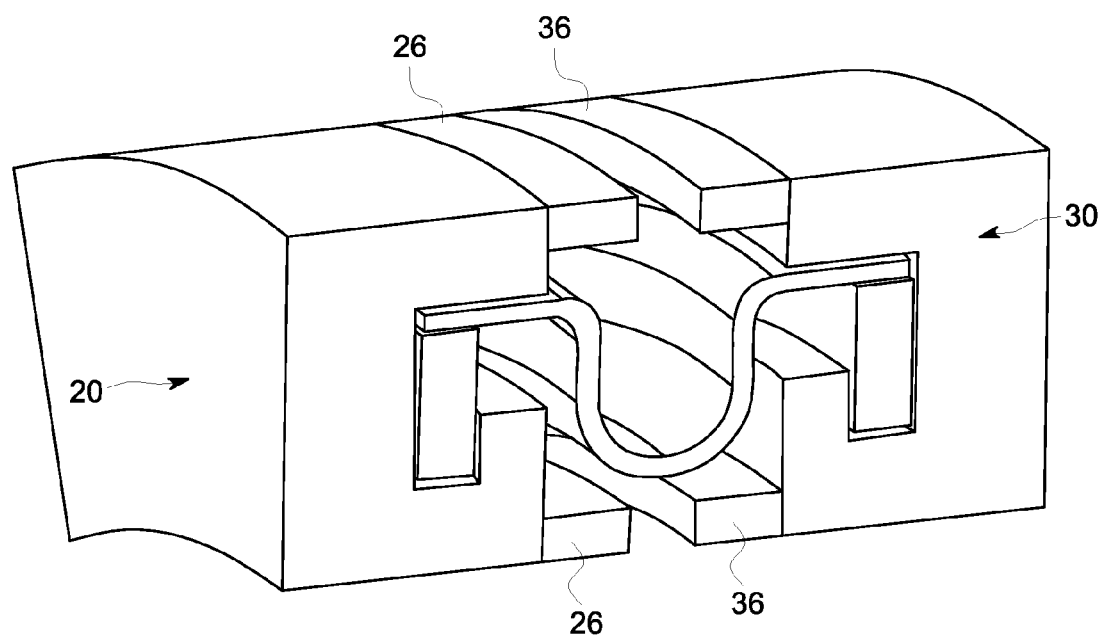
FIG. 2 is a perspective view of a portion of a seal end attachment in accordance with further embodiments.
Figure 5:
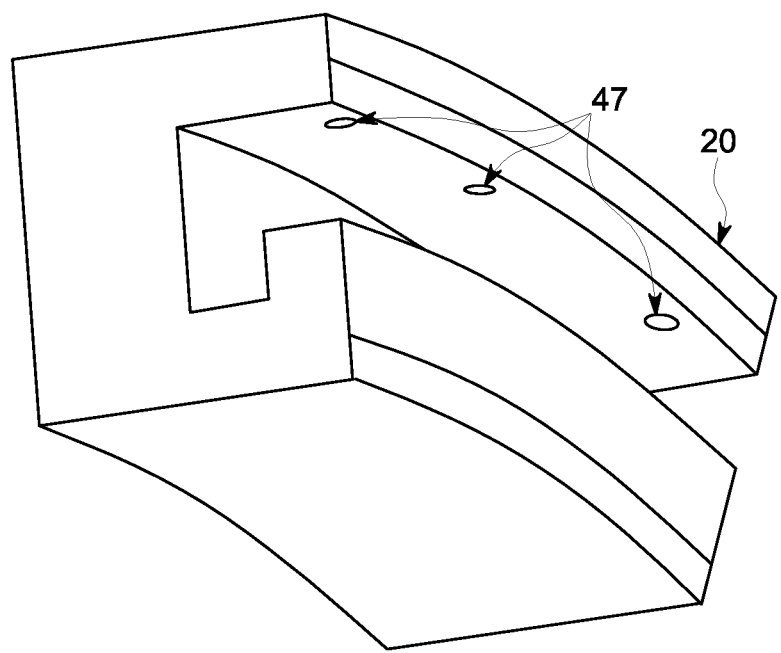
FIG. 5 is a perspective view of a portion of a vessel of the seal end attachment of FIG. 1.

As shown in FIG. 1 and, with reference to FIGS. 2 and 5, the first vessel 20 is formed to define a first recess 21 with a mating surface 22 and a shoulder surface 23. The first vessel 20 has an annular shape and the first recess 21 extends circumferentially along the circumferential length of the first vessel 20. The first recess 21 is formed with an angular G-shaped cross-section such that the mating surface 22 extends in the axial direction at an outer radial location and the shoulder surface 23 extends in the axial direction at an inner radial location. A radial sidewall 24 extends between the mating surface 22 and the shoulder surface 23 and a radial flange 25 extends radially from the shoulder surface 23 but does not reach the mating surface 22.

Similarly, the second vessel 30 is formed to define a second recess 31 with a mating surface 32 and a shoulder surface 33. The second vessel 30 has an annular shape and the second recess 31 extends circumferentially along the circumferential length of the second vessel 30. The second recess 31 is formed with a reversed angular G-shaped cross-section such that the mating surface 32 extends in the axial direction at an outer radial location and the shoulder surface 33 extends in the axial direction at an inner radial location. A radial sidewall 34 extends between the mating surface 32 and the shoulder surface 33 and a radial flange 35 extends radially from the shoulder surface 33 but does not reach the mating surface 32.

One or both of the first and second vessels 20 and 30 may each further include axial flanges 26 and 36 at one or both of an outer radial location and an inner radial location. The axial flanges 26 and 36 may serve to interfere with leakage flow propagating towards the seal end attachment 11.

The seal end attachment 11 further includes a seal 40 having an outer surface 41 and an inner surface 42. The seal 40 is configured to prevent leakage of the working fluid as the working fluid flows through the first vessel 20 and into the second vessel 30. The seal 40 has an annular shape and extends between the first and second recesses 21 and 31 such that the outer surface 41 contacts the first and second mating surface 22 and 32. At an initial assembly time, the contact between the outer surface 41 and the first and second mating surfaces 22 and 32 may be relatively tight such that a seal is formed therebetween.

Figure 4:
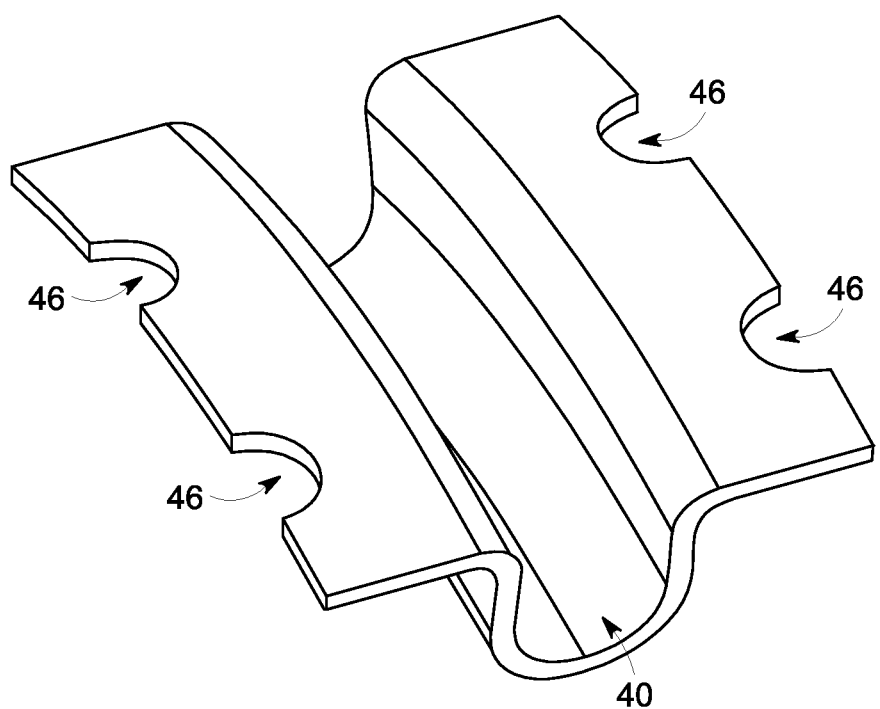
FIG. 4 is a perspective view of a portion of a seal of the seal end attachment of FIG. 1.

As shown in FIG. 1 and, with reference to FIG. 4, the seal 40 includes a first annular flange 43 to contact the mating surface 22 of the first vessel 20, a second annular flange 44 to contact the mating surface 32 of the second vessel 30 and a central annular section 45 by which the first and second annular flanges 43 and 44 are connected to one another. The first and second annular flanges 43 and 44 may extend in opposite axial directions and, at least initially, may be coaxial.

The first and second annular flanges 43 and 44 may be further formed to define cooling locations 46 in agreement with cooling holes 47 (see FIG. 5) formed through the first and second vessels 20 and 30. As such, coolant may flow radially inwardly toward the mating surfaces 22 and 32 and the first and second annular flanges 43 and 44 to decrease temperatures thereof.

The central annular section 45 may be formed to define a circumferential groove 460 by which differential thermal growth between the first and second vessels 20 and 30 may be absorbed. That is, as the first and second vessels 20 and 30 approach toward or recede from one another or move laterally or vertically with respect to one another due to differential thermal growth, the central annular section 45 may deform to prevent strain being applied to the first and second annular flanges 43 and 44, which may be sealed to the mating surfaces 22 and 32 as described herein. The circumferential groove 460 may be formed to bias the first and second annular flanges 43 and 44 into seal forming contact with the mating surfaces 22 and 32.

The seal end attachment 11 further includes first and second pressing members 50 and 51, which are disposed within the first recess 21 of the first vessel 20 and the second recess 31 of the second vessel 30, respectively. Each of the first and second pressing members 50 and 51 is formed of materials that are more responsive to a condition than the materials of the first and second vessels 20 and 30 and, possibly the materials of the seal 40. In accordance with an embodiment, the condition may be the exposure of first and second vessels 20 and 30 and seal 40 to high temperatures and pressures associated with or due to, for example, the passage of the working fluid through the first vessel 20, the seal 40 and the second vessel 30 where the working fluid includes products of combustion within the first vessel. These exemplary high temperatures and pressures may heat the first and second vessels 20 and 30, the seal 40 and the first and second pressing members 50 and 51 and thereby cause thermal expansion and/or deformation of the first and second vessels 20 and 30, the seal 40 and the first and second pressing members 50 and 51. With the first and second pressing members 50 and 51 formed to each have a mean coefficient of thermal expansion (CTE) that exceeds the respective CTE of each of the first and second vessels 20 and 30, a basic principal of operation of the first and second pressing members 50 and 51 may be that they increase frictional, sealing contact between the seal 40 and the first and second vessels 20 and 30 as described below.

Figure 3:
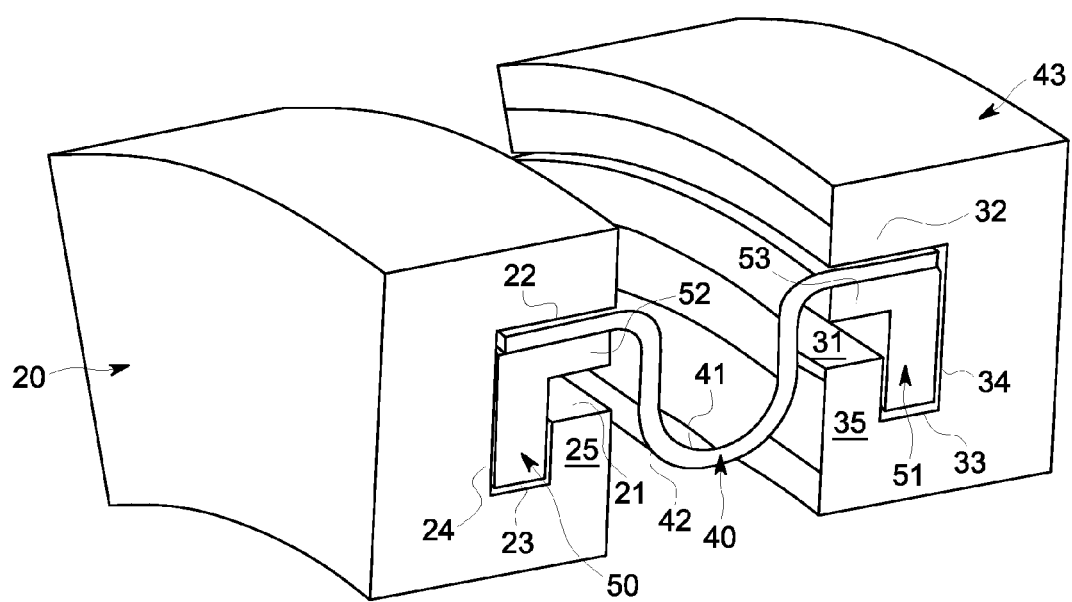
FIG. 3 is a perspective view of a portion of a seal end attachment in accordance with further embodiments.

As shown in FIG. 1 and, with reference to FIG. 3, each pressing member 50 and 51 is annular and ring-shaped and may be disposed within the first and second recess 21 and 31, respectively. In this position, the first pressing member 50 contacts the shoulder surface 23 and the inner surface 42 of the seal 40 at the first annular flange 43. The first pressing member 50 may also abut one or both of the radial sidewall 24 and the radial flange 25. Similarly, the second pressing member 51 contacts the shoulder surface 33 and the inner surface 42 of the seal 40 at the second annular flange 44 and may also abut the radial sidewall 34 and the radial flange 35. In some embodiments, the first and second pressing members 50 and 51 are formed with spacing tolerances between one or both of the radial sidewalls 24, 34 and the radial flanges 25, 35 in order to permit axial thermal growth of the first and second pressing members 50 and 51.

In an exemplary case where the first and second pressing members 50 each have a higher mean CTE than those of the first and second vessels 20 and 30, the first and second pressing members 50 and 51 will tend to experience thermal expansion in the radial direction to a greater degree than the first vessel 20 or the second vessel 30 in the presence of the exemplary high temperature fluids such as those seen in a combustion zone of a gas turbine engine in operation. Thus, radial expansion of the first and second pressing members 50 and 51 will tend to exceed changes in radial separation between the mating surfaces 22, 32 and the shoulder surfaces 23, 33. As such, the thermally grown first and second pressing members 50 and 51 will be squeezed between the shoulder surfaces 23, 33 and the mating surfaces 22, 32 with the first and second annular flanges 43 and 44 interposed therebetween. This effectively presses the outer surface 41 of the seal 40 against the mating surfaces 22 and 32 to increase a sealing effect of the seal 40. Meanwhile, as noted above, differential thermal growth between the first vessel 20 and the second vessel 30 may be absorbed by the central annular portion 45 of the seal 40.

One or both of the first and second pressing members 50 and 51 may each further include an axial flange 52, 53 to increase an area whereby the first and second pressing members 51 and 51 press upon the seal 40 toward the mating surfaces 23 and 33.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A seal end attachment, comprising:
    a vessel through which a working fluid flows, the vessel being formed to define an angular G-shaped recess with a radial flange having opposing innermost and outermost axial faces, a mating surface therein, a shoulder surface opposite the mating surface and a radial sidewall opposite the innermost axial face of the radial flange;
    a seal contacting the mating surface; and a pressing member being more responsive to a high temperature condition associated with the flow of the working fluid than the vessel and being disposed within the angular G-shaped recess to press the seal against the mating surface responsive to the high temperature condition being present, the pressing member having an uncompressed shape that is similar to a shape of a region delimited by the mating surface, the shoulder surface, the radial sidewall and the innermost axial face of the radial flange and comprising opposing innermost and outermost axial faces and, with the pressing member disposed within the angular G-shaped recess, the outermost axial face of the pressing member is aligned with or recessed from the innermost axial face of the radial flange.

2. The seal end attachment according to claim 1, wherein the vessel comprises one of an aft end of a transition piece and a forward end of a stage 1 nozzle.

3. The seal end attachment according to claim 1, wherein the vessel, the seal and the pressing member are each annular.

4. The seal end attachment according to claim 1, wherein a material of the pressing member has a higher coefficient of thermal expansion than respective materials of the vessel.

5. A seal end attachment, comprising:

a vessel through which a working fluid flows, the vessel being formed to define an angular G-shaped recess with a radial flange having opposing innermost and outermost axial faces and with opposite mating and shoulder surfaces therein and with a radial sidewall opposite the innermost axial face of the radial flange;

a seal contacting the mating surface; and a pressing member being more responsive to a high temperature condition associated with the flow of the working fluid than the vessel and being disposed to contact the shoulder surface and the seal within the angular G-shaped recess to press the seal against the mating surface responsive to the high temperature condition being present while being supported by the shoulder surface, the pressing member having an uncompressed shape that is similar to a shape of a region delimited by the opposite mating and shoulder surfaces, the radial sidewall and the innermost axial face of the radial flange and comprising opposing innermost and outermost axial faces and, with the pressing member disposed to contact the shoulder surface and the seal within the angular G-shaped recess, the outermost axial face of the pressing member is aligned with or recessed from the innermost axial face of the radial flange.

6. The seal end attachment according to claim 5, wherein the vessel comprises one of an aft end of a transition piece and a forward end of a stage 1 nozzle.

7. The seal end attachment according to claim 5, wherein the vessel, the seal and the pressing member are each annular.

8. The seal end attachment according to claim 5, wherein a material of the pressing member has a higher coefficient of thermal expansion than respective materials of the vessel.

9. A gas turbine having a seal end attachment, comprising:

first and second vessels through which a working fluid flows, the first vessel being formed to define an angular G-shaped recess with a radial flange having opposing innermost and outermost axial faces and with mating and shoulder surfaces therein and with a radial sidewall opposite the innermost axial face of the radial flange of the first vessel and the second vessel being formed to define an angular G-shaped recess with a radial flange having opposing innermost and outermost axial faces and with opposite mating and shoulder surfaces therein and with a radial sidewall opposite the innermost axial face of the radial flange of the second vessel;

a seal extending between the angular G-shaped recesses of the first and second vessels and contacting the mating surfaces of the first and second vessels, respectively; and first and second pressing members disposed within the angular G-shaped recesses of the first and second vessels, respectively, each of the first and second pressing members being more responsive than the first and second vessels to a high temperature condition caused by the flow of the working fluid affecting respective temperatures of the first and second vessels and the first and second pressing members, each of the first and second pressing members being disposed to contact the respective shoulder surfaces of the first and second vessels and the seal to press the seal against the respective mating surfaces of the first and second vessels responsive to the high temperature condition being present while being supported by the respective shoulder surfaces of the first and second vessels, and the first pressing member having an uncompressed shape that is similar to a shape of a corresponding region of the first vessel delimited by the opposite mating and shoulder surfaces of the first vessel, the radial sidewall of the first vessel and the innermost axial face of the radial flange of the first vessel, the second pressing member having an uncompressed shape that is similar to a shape of a corresponding region of the second vessel delimited by the opposite mating and shoulder surfaces of the second vessel, the radial sidewall of the second vessel and the innermost axial face of the radial flange of the second vessel and each of the first and second pressing members comprising opposing innermost and outermost axial faces and, with the first and second pressing members disposed to contact the respective shoulder surfaces of the first and second vessels and seal within the respective angular G-shaped recesses of the first and second vessels, the respective outermost axial faces of the first and second pressing members are aligned with or recessed from the respective innermost axials faces of the respective radial flanges of the first and second vessels.

10. The gas turbine according to claim 9, wherein the first vessel comprises an aft end of a transition piece.

11. The gas turbine according to claim 9, wherein the second vessel comprises a forward end of a stage 1 nozzle.

12. The gas turbine according to claim 9, wherein the first and second vessels, the seal and the first and second pressing members are each annular.

13. The gas turbine according to claim 9, wherein a material for each of the first and second pressing members has a higher coefficient of thermal expansion than respective materials of the first and second vessels.

14. The gas turbine according to claim 9, wherein the first and second vessels each comprise an axial flange that extend axially from complementary axial ends of the first and second vessels to protrude beyond respective planes of the respective outermost axial faces of the respective radial flanges of the first and second vessels.

15. The gas turbine according to claim 9, wherein the first and second pressing members are each ring-shaped.

16. The gas turbine according to claim 9, wherein the first and second pressing members each comprise an axial flange.

17. The gas turbine according to claim 9, wherein the seal comprises:
- a first annular flange to contact the mating surface of the first vessel;
- a second annular flange to contact the mating surface of the second vessel; and
- a central annular section by which the first and second annular flanges are connected.

18. The gas turbine according to claim 17, wherein the central annular section is formed to define a circumferential groove.

19. The gas turbine according to claim 17, wherein the first and second annular flanges are formed to define cooling locations.

* * * * *